(12) United States Patent
Ozer

(10) Patent No.: US 10,614,531 B2
(45) Date of Patent: Apr. 7, 2020

(54) FILTER-BASED DYNAMIC POWER SYSTEM OPERATION DASHBOARDS

(71) Applicant: S & C ELECTRIC CO., Chicago, IL (US)

(72) Inventor: Gokturk Ozer, Gaithersburg, MD (US)

(73) Assignee: S&C Electric Company, Chicago, IL (US)

( * ) Notice: Subject to any disclaimer, the term of this patent is extended or adjusted under 35 U.S.C. 154(b) by 464 days.

(21) Appl. No.: 14/682,842

(22) Filed: Apr. 9, 2015

(65) Prior Publication Data
US 2015/0294013 A1 Oct. 15, 2015

Related U.S. Application Data

(60) Provisional application No. 61/978,388, filed on Apr. 11, 2014.

(51) Int. Cl.
*G06F 7/02* (2006.01)
*G06F 16/00* (2019.01)
(Continued)

(52) U.S. Cl.
CPC ............ *G06Q 50/06* (2013.01); *G06F 16/26* (2019.01); *G06Q 10/0639* (2013.01)

(58) Field of Classification Search
CPC ............ G05B 2219/13; G05B 23/0208; G05B 23/0294; G05B 15/02; H04L 43/065; G05F 1/66; G06F 17/30572; G06F 17/30; G06F 17/18; G06F 16/00; G06F 16/26; G06F 16/248; G06Q 30/06; G01R 19/2513; G01R 21/133
See application file for complete search history.

(56) References Cited

U.S. PATENT DOCUMENTS 6,961,641 B1\* 11/2005 Forth ..................... G06Q 50/06 700/22
7,493,310 B2   2/2009 Eryurek et al.
(Continued)

FOREIGN PATENT DOCUMENTS

| CN | 1732416 A | 2/2006 |
|---|---|---|
| CN | 101097649 A | 1/2008 |
| WO | WO2006010738 A1 | 2/2006 |

OTHER PUBLICATIONS

Rocks, Danny, "How to Generate Multiple Reports from One Pivot Table," www.thecompanyrocks.com, Mar. 11, 2011, accessed Nov. 19, 2018 (Year: 2011).\*

(Continued)

*Primary Examiner* — Bruce M Moser

(57) ABSTRACT

A system and method for improving operation of power systems using global filtering criteria across multiple reports or dashboards is provided herein. The system and method may receive data regarding electric power system components, along with a filter selection from a power system operator. The operator's filter selection is applied to the received data, and a first summary is generated. Upon receiving a request to generate a second summary, the system and method apply the filters to the received data to generate a second summary without requiring additional filter selection. The power system operator may then use the generated data in operating the power system.

17 Claims, 6 Drawing Sheets

(51) Int. Cl.
*G06Q 50/06* (2012.01)
*G06F 16/26* (2019.01)
*G06Q 10/06* (2012.01)

(56) References Cited

U.S. PATENT DOCUMENTS

| | | | |
|---|---|---|---|
| 7,949,208 B2 | 5/2011 | Yanai | |
| 2002/0032535 A1* | 3/2002 | Alexander | G01R 21/133 |
| | | | 702/64 |
| 2008/0027683 A1 | 1/2008 | Middleton et al. | |
| 2010/0049472 A1 | 2/2010 | Keefe et al. | |
| 2011/0071693 A1* | 3/2011 | Sun | G06F 17/30557 |
| | | | 700/291 |
| 2012/0158327 A1* | 6/2012 | Hurri | G06Q 50/06 |
| | | | 702/62 |
| 2012/0271576 A1* | 10/2012 | Kamel | H02J 13/0006 |
| | | | 702/62 |
| 2012/0283988 A1 | 11/2012 | Pandey et al. | |
| 2013/0055132 A1 | 2/2013 | Foslien | |
| 2013/0086107 A1* | 4/2013 | Genochio | G06F 17/30572 |
| | | | 707/769 |
| 2013/0204450 A1* | 8/2013 | Kagan | H04L 67/06 |
| | | | 700/291 |
| 2013/0253898 A1* | 9/2013 | Meagher | G06F 17/5009 |
| | | | 703/18 |
| 2015/0089027 A1* | 3/2015 | Zweigle | H04L 43/065 |
| | | | 709/219 |

OTHER PUBLICATIONS

International Search Report and Written Opinion for Application No. PCT/US2015/025238 dated Jul. 9, 2015.
Chinese Office Action for Chinese patent application No. 20158003109.5 dated dated Jul. 30, 2018. (8 pages).

* cited by examiner

FILTER-BASED DYNAMIC POWER SYSTEM OPERATION DASHBOARDS

CROSS-REFERENCE TO RELATED APPLICATIONS

This application claims the benefit of U.S. Provisional Application No. 61/978,388, filed Apr. 11, 2014, the entirety of which is incorporated herein by reference.

TECHNICAL FIELD

The present disclosure generally relates to a system and a method for improving operation of power systems using global filtering criteria across multiple reports or dashboards.

BACKGROUND

Modern power systems, such as electric power generation, transmission, and distribution systems, frequently include hundreds or thousands of nodes (e.g., generating stations, transmission substations, distribution switches, etc.). Unlike previous generations of power systems, modern smart grid systems include components that transmit or receive computer-readable information. For example, a recloser in an electric power distribution system may be configured to provide data to a central control station regarding its status (e.g., normal/closed, tripped/open, locked, etc.). The recloser may further be configured to close a tripped or otherwise open circuit automatically or upon receipt of a command from the central controller. Numerous other similarly communicating components may be included in a modern smart grid. In order to properly operate such systems, data regarding the components is communicated between the components and the central node, using wired or wireless communication. Data regarding the current operating status and historical operating status is typically analyzed by power system operators to determine appropriate control, repair, and maintenance actions.

Modern computing technology facilitates the efficient generation, collection, sorting, presentation, and analysis of large quantities of information. To make sense of the information, it is often beneficial to review a number of different data summaries that present the same or related information in different ways. Reports and dashboards are widely used in software applications to summarize and present data in ways that show trends, problems, savings, or other salient features of the data. These reports and dashboards enable users of the software applications quickly and easily to visualize and understand large amounts of data. In some cases, however, it becomes advantageous or necessary to restrict the data used in the summaries to focus on particular areas of interest. Selecting the data to be displayed in a report or dashboard is typically done in one of two ways. First, software developers may create sets of filters or queries for specific reports or dashboards during development of the software application. These filters or queries are simple for the user to apply, but they cannot be revised without updating or reinstalling the software. Second, the software application may permit the user to select data filters for each report or dashboard on an ad hoc basis, providing greater flexibility to set or modify the filter parameters. This approach suffers the disadvantage of requiring the filters to be specified separately for each report or dashboard.

SUMMARY

A method, system, and computer-readable medium storing instructions for improving data presentation for electric power system operation by applying data filters across a plurality of summaries of data in an application are disclosed herein. One embodiment comprises a computer-implemented method including: receiving a data set stored in one or more databases; presenting a plurality of data filters to a user of the application; receiving a request from the user to apply a set of one or more of the data filters to the data set; generating a first summary of the data set by applying the set of data filters to the data set; presenting the first summary of the data set to the user; receiving a request from the user to present a second summary of the data set; generating the second summary of the data set by applying the set of data filters to the data set; and presenting the second summary of the data set to the user. The data filters may include one or more of the following: date, time, geographic area, type of process, type of equipment, operating status, completion status, value, operational division, project, customer, type of data field, type of data value, type of event, number of events, type of alert, number of alerts, node, type of node, or level of node. The set of data filters may further be stored in a computer memory for future use by the user.

The first and second summaries may include a graphical report, a tabular report, a textual report, a graphical dashboard, a tabula dashboard, or a textual dashboard. Additionally, the first and second summaries may include information regarding the status of the components, the type of the components, the location of the components, the reliability of the components, or events relating to the components. Generating the first and second summaries may include adjusting the first and second summaries, respectively, to apply the set of data filters to the data set. In some embodiments, a server communicatively connected to a network may transmit information regarding the first and second summaries from the server to the user through the network in connection with presenting the first and second summaries to the user.

Although the computer-implemented method may be used to apply data filters across summaries of data of any sort, in some embodiments the data set may contain data relating to components within an electric power generation, transmission, and distribution system. These components may include one or more of the following: a switch, a circuit breaker, a recloser, a transformer, a fuse, a fuse cutout, a disconnect, a capacitor, a compensator, a control device, a station, a substation, a line, or a smart meter.

Another embodiment comprises a computer system including one or more processors and a program memory storing instructions that when executed by the one or more processors cause the computer system to: receive a data set stored in one or more databases; present a plurality of data filters to a user of the application; receive a request from the user to apply a set of one or more of the data filters to the data set; generate a first summary of the data set by applying the set of data filters to the data set; present the first summary of the data set to the user; receive a request from the user to present a second summary of the data set; generate the second summary of the data set by applying the set of data filters to the data set; and present the second summary of the data set to the user. Yet another embodiment comprises a tangible, non-transitory computer-readable medium storing instructions that when executed by one or more processors of a computer system cause the computer system to: receive a data set stored in one or more databases; present a plurality of data filters to a user of the application; receive a request from the user to apply a set of one or more of the data filters to the data set; generate a first summary of the data set by applying the set of data filters to the data set; present the first summary of the data set to the user; receive a request from the user to present a second summary of the data set; generate the second summary of the data set by applying the set of data filters to the data set; and present the second summary of the data set to the user.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Figure 1A:
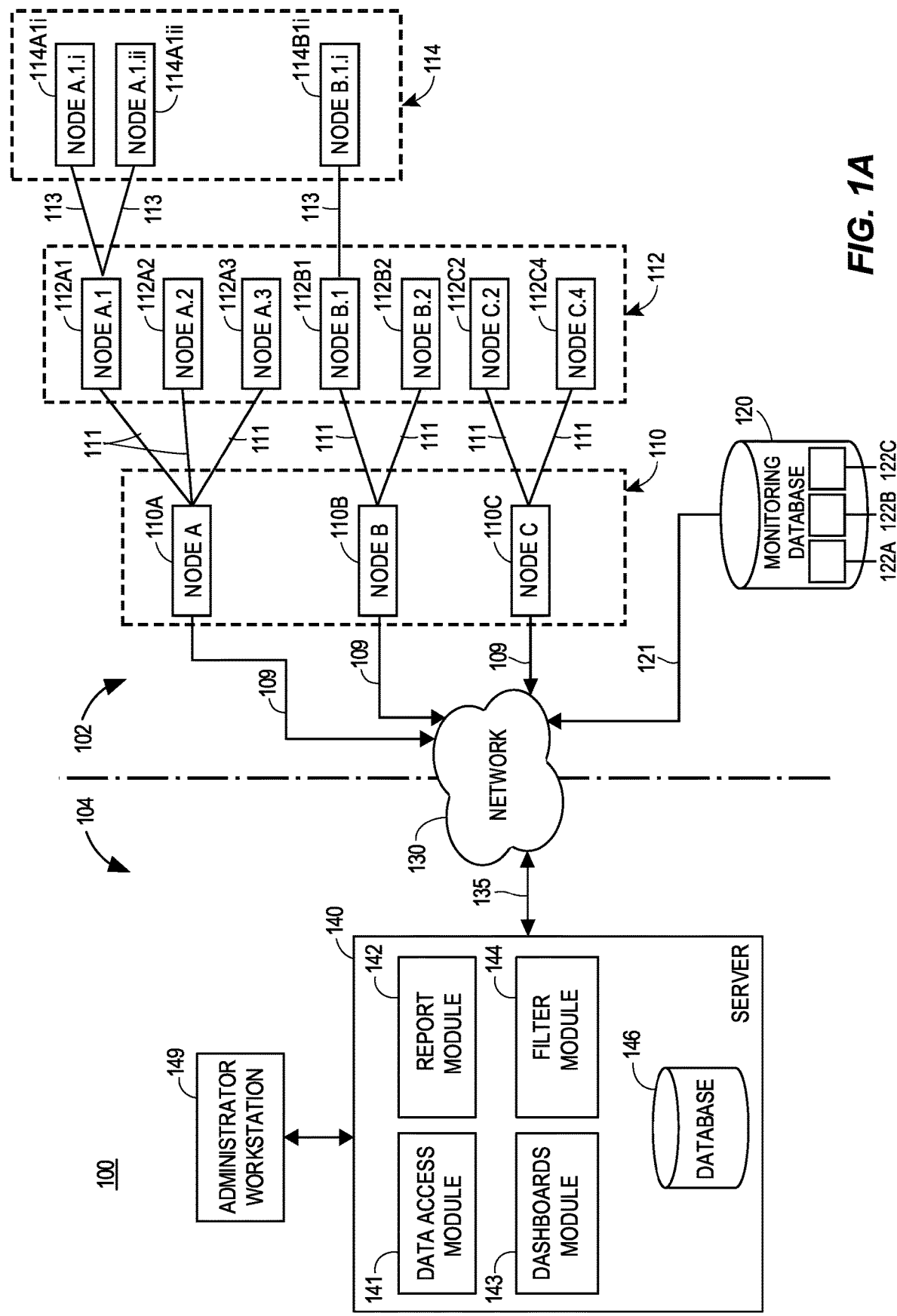
FIGS. 1A-1B illustrate block diagrams of a computer network on which an exemplary dynamic global filtering system may operate in accordance with the described embodiments.

FIG. 1A illustrates a block diagram of an exemplary dynamic global filtering system 100 for receiving and applying data filters across data summaries relating to a grid system with multiple levels of nodes, as described in FIGS. 2-4 below. The high-level architecture includes both hardware and software applications, as well as various data communications channels for communicating data between the various hardware and software components. The dynamic global filtering system 100 may be roughly divided into monitoring components 102 and analysis components 104. The monitoring components 102 generate or collect data regarding one or more processes, systems, events, devices, functions, or other types of data to be analyzed using the analysis components 104. The monitoring components 102 may be further divided into one or more groups of components that provide related data. The analysis components 104 may be disposed within one or more servers 140, communicatively connected to the monitoring components 102 through a network 130.

The monitoring components 102 may include components arranged within one or more levels or groups, such as primary nodes 110, secondary nodes 112 connected to the primary nodes 110, and tertiary nodes 114 connected to the secondary nodes 112. Except where the context indicates otherwise, a "node" or "nodes" of the monitoring components 102 may refer to any of the nodes 100, secondary nodes 112, or tertiary nodes 114. Each primary node 110 may represent a location, high-level process, distribution node, major subsystem within a system, or controller receiving input signals from one or more inputs. The primary nodes 110 may be connected to the analysis components 104 by one or more primary links 109 to the network 130. One or more secondary nodes 112 may likewise be communicatively connected to each primary node 110 by a secondary link 111 (e.g., primary node 110C is connected to secondary nodes 112C2 and 112C4 by secondary connections 111). Each secondary node 112 may provide a subset of the information associated with each primary node 110, such an information regarding a subsystem, subprocess, component, or measurements from one of a number of sensors or other data inputs. Some secondary nodes 112 may be further communicatively connected to one or more tertiary nodes 114 by a tertiary link 113 (e.g., secondary node 112A1 is connected to tertiary nodes 114A1$i$ and 114A1$ii$). The tertiary nodes 114 and any subsequent dependent nodes connected to the tertiary nodes 114 may provide more specific information or information regarding a distinct portion of a system, process, or device that may comprise part of the information associated with each tertiary node 114. It should be understood that each primary node 110, secondary node 112, or tertiary node 114 may collect information directly, collect information regarding dependent nodes, or collect both types of information simultaneously or alternately. For example, primary node 110A may collect information directly relating to the operation of primary node 110A. It may further collect information relating to the operation of secondary nodes 112A1, 112A2, and 112A3, as well as information relating to tertiary nodes 114A1$i$ and 114A1$ii$.

For example, the primary nodes 110 may represent distribution substations in an electric power transmission and distribution network forming part of a larger electric power grid (including generation, transmission, distribution, and storage). Each of primary nodes 110A, 110B, and 110C may thus produce or collect information regarding aspects of the operation or components of the respective substation. This may include the operational status of components within the substation (switches, transformers, circuit breakers, reclosers, etc.) or events related to the components (e.g., overvoltage trips, lockouts, faults, line drops, equipment malfunctions, etc.). This may also include measurements taken in the ordinary operation of the substation (e.g., transmission side voltage, distribution load fluctuations, etc.). Additionally, or alternatively, the secondary nodes 112 may include components of a substation or various distribution lines directly or indirectly receiving power from the substation (e.g., commercial or residential circuits). In the above example, the tertiary nodes 114 may include the following: a switch, a circuit breaker, a recloser, a transformer, a fuse, a fuse cutout, a disconnect, a capacitor, a compensator, a control device, a smart meter, or power storage systems on the terminal line segments. For example, secondary nodes 112A1 and 112B1 may represent distribution circuits connected to the substations at primary nodes 110A and 110B, respectively, and the tertiary nodes 114A1$i$, 114A1$ii$, and 114B1$i$ may represent distribution transformers on the circuits. From this example, it should be apparent that each primary node 110, secondary node 112, or tertiary node 114 may be grouped in a variety of ways (e.g., by location, circuit, component type, etc.).

Additionally, or alternatively, the monitoring components 102 may include data from one or more sources stored in one or more monitoring databases 120, communicatively connected to the network by database link 121. The monitoring database 120 may include data that serves as a supplement or substitute for the information from the nodes. The monitoring database 120 may include a number of entries 122$a$-$c$. The entries 122$a$-$c$ in the monitoring database 120 may have a hierarchical structure (e.g., a structure similar to the structure of the nodes discussed above) or may be unstructured. Where the data is unstructured, it may nonetheless be grouped by one or more fields using known data manipulation or search techniques (e.g., Microsoft Excel®, Structured Query Language (SQL), Apache Hadoop®, etc.). For example, each of entries 122$a$-$c$ may contain information regarding switches in a power grid. If entries 122$a$ and 122$b$ relate to overhead distribution switches and entry 122$c$ relates to a circuit switch in a substation, then the entries 122$a$-$c$ may be grouped into a group of overhead switches (entries 122$a$ and 122$b$) and a group of substation switches (122$c$). Other groupings could similarly be made based on different fields or values of the data entries in the monitoring database 120. In some embodiments, the one or more monitoring databases 120 may be disposed within or connected to one or more servers (not shown), which may either receive data from connected devices or store data collected or generated by other data sources.

The monitoring components 102 may communicate with the analysis components 104 via the network 130. The network 130 may be a proprietary network, a secure public internet, a virtual private network or some other type of network, such as dedicated access lines, plain ordinary telephone lines, satellite links, cellular data networks, radio communication, power line communication, combinations of these, etc. Where the network 130 comprises the Internet, data communications may take place over the network 130 via an Internet communication protocol. The analysis components 104 may include one or more servers 140. Each server 140 may include one or more computer processors adapted and configured to execute various software applications and components of the dynamic global filtering system 100, in addition to other software applications. The server 140 may further include or be connected to a database 146 that is adapted to store data related to the monitoring components 102, users of the server 140, or other information related to the dynamic global filtering system 100. Such data may include, for example, information regarding the configuration of the monitoring components 102, types of components at each node (e.g., a switch, a circuit breaker, a recloser, a transformer, a fuse, a fuse cutout, a disconnect, a capacitor, a compensator, a control device, a station, a substation, a line, or a smart meter, etc.), data available at each node (e.g., alerts, operating status, overvoltages, reclosures, current spikes, current dips, etc.), user configurations, stored filter selections, or other information. In addition, the database 146 may store information from the nodes of the monitoring components 102, including the following: events (e.g., faults, overcurrent trips, open circuits, alerts, malfunctions), times associated with events, duration of events, other components effected by events, operating status of components, etc. Alternatively, such information from the nodes of the monitoring components 102 may instead be stored in the monitoring database 120. In some embodiments, the server 140 may receive information from the nodes of the monitoring components 102 and cause the information to be stored in the monitoring database 120. The server 140 may access data stored in the database 146 or the monitoring database 120, as well as data stored in other systems (not shown) when executing various functions and tasks associated with the operation of the dynamic global filtering system 100.

Although the dynamic global filtering system 100 is shown to include one server 140, one database 146, one monitoring database 120, and a plurality of nodes 110, secondary nodes 112, and tertiary nodes 114, it should be understood that different numbers of any or all of the elements may be utilized. For example, the system 100 may include a plurality of servers 140 and thousands of nodes, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information as well as periodic uploads and downloads of information.

Figure 1B:
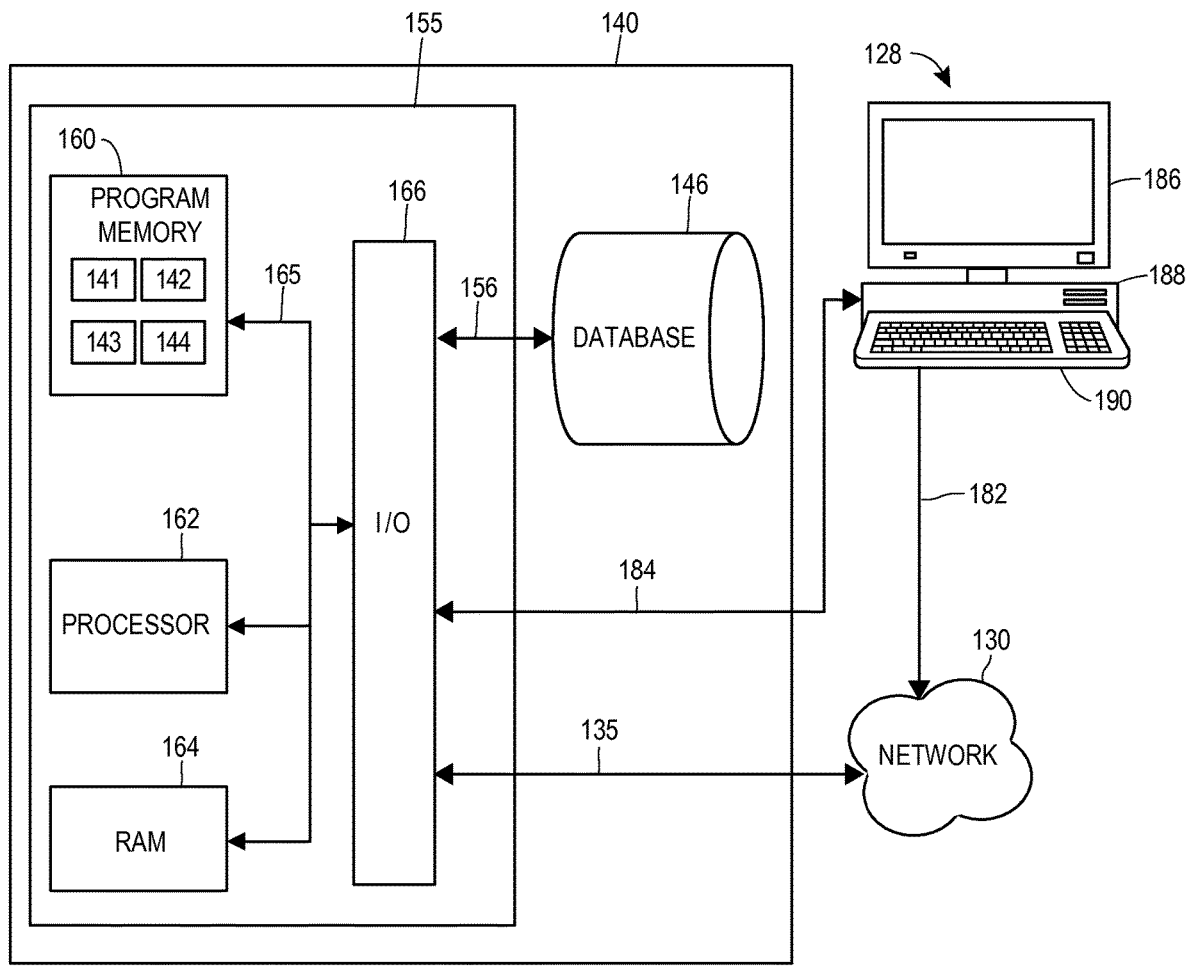

FIG. 1B is a schematic diagram of one possible embodiment of the server 140. The server 140 may have a controller 155 that is operatively connected to the database 146 via a link 156 in a known manner. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. Although only one program memory 160, one microprocessor 162, and one RAM 164 are shown, the controller 155 may include multiple program memories 160, microprocessors 162, or RAMs 164. Although the I/O circuit 166 is shown as a single block, it should likewise be appreciated that the I/O circuit 166 may include a number of different types of I/O circuits. The RAM 164 and program memories 160 may be implemented as semiconductor memories, magnetically readable memories, or optically readable memories, for example. The controller 155 may also be communicatively connected to the network 130 via a link 135.

The analysis components 104 may also include one or more workstations 128 communicatively connected to the controller 155 via a link 184. In some embodiments, the workstation 128 may be communicatively connected to the server 140 or the monitoring components 102 via the network 130 through a link 182. The workstation 128 may be any computing device, including a desktop computer, a notebook computer, a tablet computer, a mobile device (e.g., a smartphone), a network terminal, or other commercially available or custom computing device. Although not shown, each workstation 128 may include any or all of the components included in the controller 155. The workstations 128 may further include displays 186 and keyboards 190, as well as a variety of other input/output devices (not shown) such as scanners, printers, touch screens, track pads, track balls, voice recognition systems, digital cameras, etc. Managers, engineers, technicians, analysts, or other users (not shown) may sign on to the workstations 128 using any generically available technique, such as entering a user name and password.

The server 140 may further include a number of software applications stored in a program memory 160. The software applications may be executed on the one or more processors 162. The various software applications may include a data access module 141 to receive data from the nodes of the monitoring components 102 or access data stored in the monitoring database 120 or the database 146. In some embodiments, the data access module 141 may request or receive data from one or more third-party databases accessible through the network 130. The software applications may further include report module 142 for generating and presenting reports, as well as a dashboard module 143 for running and presenting dashboards to allow a user to monitor or analyze information relating to the monitoring components 102. Additionally, the software applications may include a filter module 144 that operates in concert with the data access module 141 and the report and dashboard modules 142 and 143 to limit the data used in producing or displaying reports and dashboards to the user. Those of ordinary skill in the art will appreciate that these modules may be implemented in any number of modules; their functions need not be divided as indicated in FIGS. 1A-B.

Finally, the analysis components 104 may include one or more administrator workstations 149. The administrator workstation 149 allows an authorized user to access the various applications running on the server 140 to alter or adjust the operation of the dynamic global filtering system 100. For example, a new node or type of node may be added to the monitoring components 102, requiring an update to the data access module 141 or the database 146. The administrator may then access the server 140 via the administrator workstation 149 and make the appropriate changes.

Figure 2:
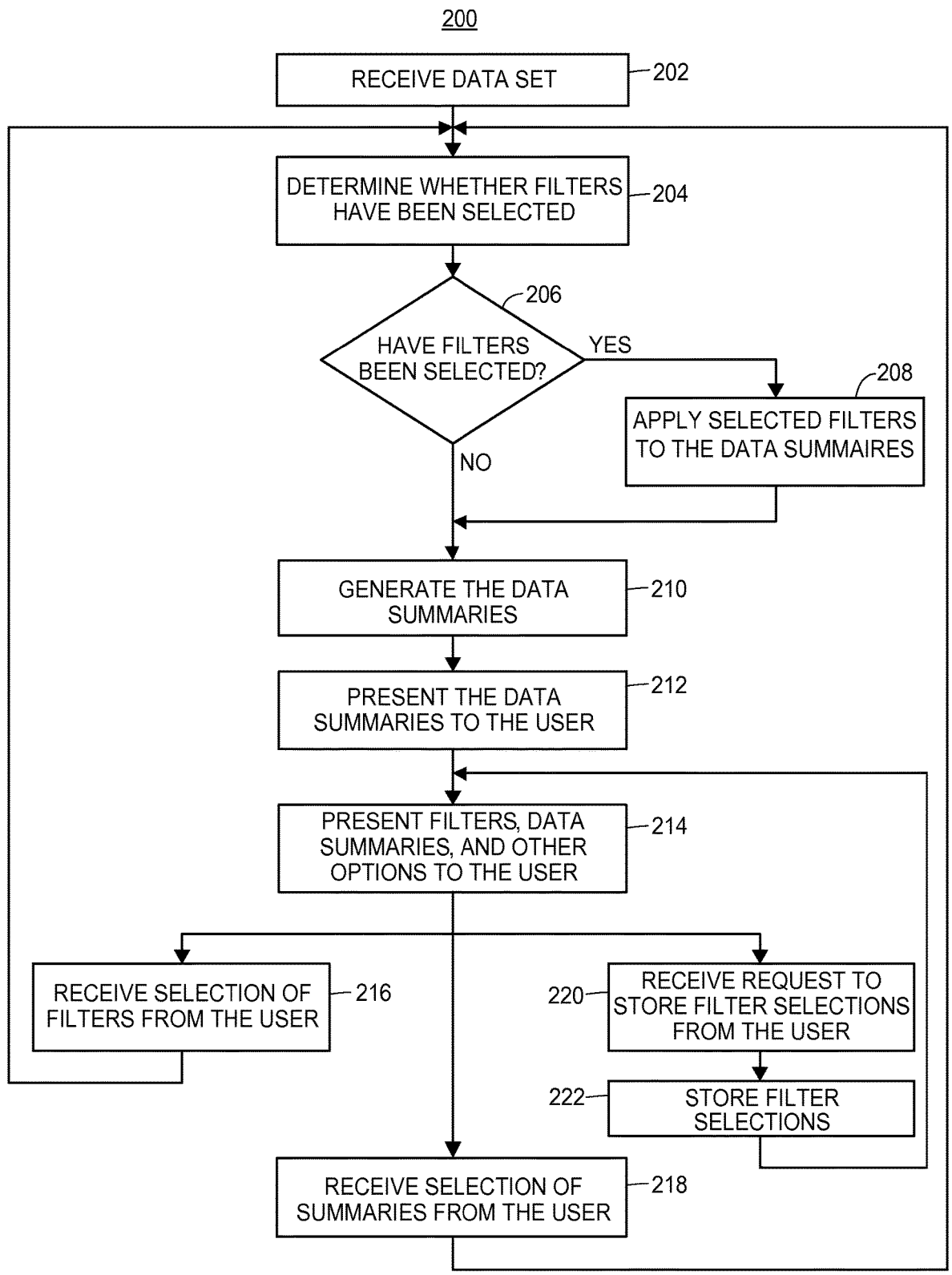
FIG. 2 illustrates a flow diagram of an exemplary dynamic global filtering process for receiving and applying data filters across a plurality of data summaries in accordance with the described embodiments.

FIG. 2 illustrates an exemplary dynamic global filtering process 200 for receiving and applying data filters across a plurality of data summaries. The process 200 receives a data set at block 202, determines whether any filters have been selected by the user at blocks 204-206, applies any selected filters at block 208, generates one or more data summaries (with or without filters) at block 210, presents the data summaries at block 212, and presents filter, summary, and other options to the user at block 214. When a new set of filters is selected at block 216, the blocks 204-214 are implemented again to apply the filters. When a new set of data summaries is selected at block 216, the blocks 204-214 are implemented again to present the new data summaries. Additionally, a set of filter conditions may be stored for future use at blocks 220-222. The process 200 may be implemented using the server 140 or the workstation 128 in communication with the server 140. For clarity, the following discussion will assume the processes illustrated in FIGS. 2-4 are implemented on one server 140 communicatively connected to one workstation 128, with which the user interacts, but it should be understood that other configurations of the components of the system 100 discussed above may be used.

The process 200 begins at block 202 with the server 140 receiving one or more data sets. Block 202 may be initiated in response to a request from a user to present one or more dashboards, reports, or other data summaries. The server may implement the data access module 141 to obtain a data set from the database 146 or the monitoring database 120. Additionally, or alternatively, the server may implement the data access module 141 to request or receive data directly from the nodes through the network 130. For example, the data access module 141 may send a signal from the server 140 through the network 130 to request the operating status of each node listed in a table of the database 146, creating a data set from the responses received (including non-responses as data indicating an unknown or nonoperational status). In some embodiments, additional data sets may be added at a later point in the process, having the effect of restarting the process at block 202 while retaining any filter or data summary selections by the user at the point the additional data set is added.

Once the data set has been received, the server 140 determines at block 204 whether a set of filters has been selected by the user. In some embodiments, this may include the use of a state variable to indicate whether any set of filters has been selected or whether no set of filters has been selected. In other embodiments, the server may examine all potential filters to determine whether they contain any values (e.g., the filter conditions are not null). Where one or more filters are found to have been selected at block 206, the filters are applied to the data summaries at block 208. In some embodiments, this may involve passing a set of query conditions representing the selected filters to one or more report modules 142 or dashboard modules 143. The report or dashboard modules 142 or 143 must be configured to receive the query conditions. For example a filter limiting a report generated by a report module 142 to data associated with primary node 110B and its dependent nodes (secondary nodes 112B1 and 112B2, as well as tertiary node 114B1i) may be represented by a query condition that the primary node 110 associated with the data must be primary node 110B. Every report that may be generated by the report module 142 and every dashboard that may be generated by the dashboard module 143 must be capable of receiving such query conditions.

Once the selected filters are applied to the data summaries at block 208, the report module 142 or the dashboard module 143 running on the server 140 may generates the one or more data summaries at block 210 from the received data set, using the selected filters applied at block 208. Where no filters are found to have been selected at block 206, the report module 142 or the dashboard module 143 generates the data summaries at block 210 without using any set of filters from the user. The data summaries may include one or more of the following: a graphical report, a tabular report, a textual report, a graphical dashboard, a tabula dashboard, or a textual dashboard. The data summaries generated at block 210 may then be communicated from the server 140 to the workstation 128 and presented to the user at block 212 using the display 186. A number of reports and dashboards may be combined into one or more pages or display configurations, which may be customizable by the user according to known techniques.

Figure 3:
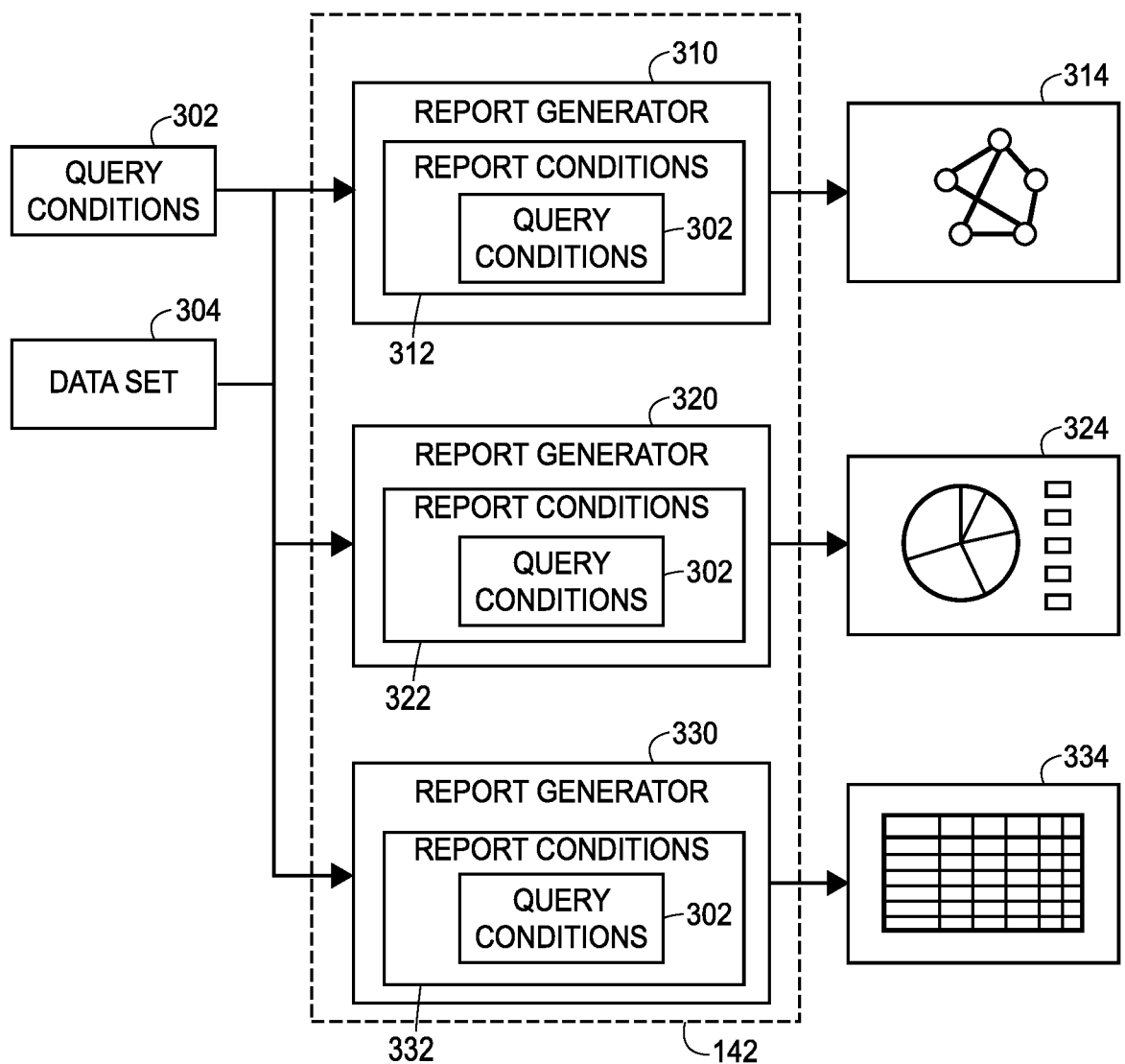
FIG. 3 illustrates an exemplary embodiment of a report module designed to receive filter selections represented by query conditions.

FIG. 3 illustrates an exemplary embodiment of a report module 142 designed to receive filter selections represented by query conditions. The exemplary embodiment receives the query conditions 302 as an input, along with a data set 304. The query conditions may be a set of instructions for searching the data set 304 using an appropriate syntax (e.g., SQL, Java). The exemplary report module 142 may contain a number of report generators 310, 320, and 330. Each report generator may contain instructions to produce a different type or report using the query conditions 302 and the data set 304. For example, report generator 310 may produce a network diagram 314, report generator 320 may produce a chart 324, and report generator 330 may produce a tabular report 334. Each of the report generators 310, 320, and 330 contains a set of report conditions 312, 322, and 332, respectively. Each of these sets of report conditions 312, 322, and 332 may contain within them the full set of potential query conditions 302. Thus, any set of query conditions 302 representing any allowable set of filter selections may be incorporated within any of the report generators within the report module 142. For example, report generator 310 receives the query conditions 302 and the data set 304, then generates a network diagram 314 from the data set 304 using the report conditions 312, which contain the query conditions 302. If no query conditions exist, the report module 310, 320, or 330 applies its default values contained within the report conditions 312, 322, or 332, respectively. Although FIG. 3 illustrates an exemplary embodiment of a report module 142, the same approach may be applied to the dashboard module 143 or a means of generating any other data summaries.

Returning to FIG. 2, the server 140 may then present a variety of available filters, data summaries, and other options regarding the data to the user on the display 186 at block 214. These options may include different types or groups of reports or dashboards that may be implemented by the report module 142 or the dashboard module 143, such as tables, lists, histograms, bar charts, pie charts, line graphs, scatter plots, network diagrams, process diagrams, gauges, instrument panels, or combinations of these or other types of data summaries. The options also include one or more selectable filters, which may include options to filter the data according to the following: date, time, geographic area, type of process, type of equipment, operating status, completion status, value, operational division, project, customer, type of data field, type of data value, type of event, number of events, type of alert, number of alerts, node, type of node, level of node, or combinations or ranges of any of these. For example, in the context of an electric power grid, the filters may allow the user to select a date range, a time range, an interval for data presentation (e.g. 5 minute interval, 1 hour intervals), a geographic area (e.g., an area served by one or more substations), a type of equipment or equipment group (e.g., all overhead distribution equipment, overhead distribution switches, particular models of overhead distribution switches, all reclosers, reclosers with particular software versions), device status (e.g., operational, faulted, unknown, malfunctioning, closed, open), types of events (e.g., overvoltage trips, overcurrent trips, all trips, maintenance performed), numbers of events (e.g., more than 5 trips on a switch within a day), duration of status (e.g., equipment with unknown status for more than a day), or duration of events (e.g., lockouts lasting more than an hour). In some embodiments, the filter module 144 may determine a set of available filters to present to the user based on the data set. The filter module 144 may further manage the filters presented to the user to prevent the selection of set of filters that would eliminate all correct data entries. Other options presented to the user may include options typical of summaries presented using a computer display, including size at which to display a data summary, location or layout of data summaries on a screen, rows of a table to be displayed, or similar options known in the art.

The user may then select one or more options presented in block 214 using the workstation 128, which communicates the selections to the server 140. Where the user selects a set of one or more filters from the set of available filters using the workstation 128, the server 140 receives the selection of the set of filters at block 216. In the exemplary embodiment disclosed with respect to FIG. 3, this may consist of a set of query conditions sent to the server 140. Upon receiving the selection of filters at block 216, the server again implements blocks 204-216 to apply the selected filters and present the data summaries as discussed above. Where the user selects a set of one or more data summaries using the workstation 128, the server 140 receives the selection of data summaries at block 218 and again implements blocks 204-216 to present the selected data summaries as discussed above. If any filters had been previously selected, the new data summaries received at block 218 will automatically be presented at block 214 using the same set of filters.

The user may further select an option presented at block 214 to store one or more sets of selected filters for future use. Where the user selects the option to store a set of filters, the server 140 receives a request from the workstation 128 to store the set of filters at block 220. The server 140 may then store the filter selection in the program memory 160 or the database 146 for later use by the user or other users. The server 140 may then continue to present the filter, data summary, and other options to the user at block 214.

Figure 4:
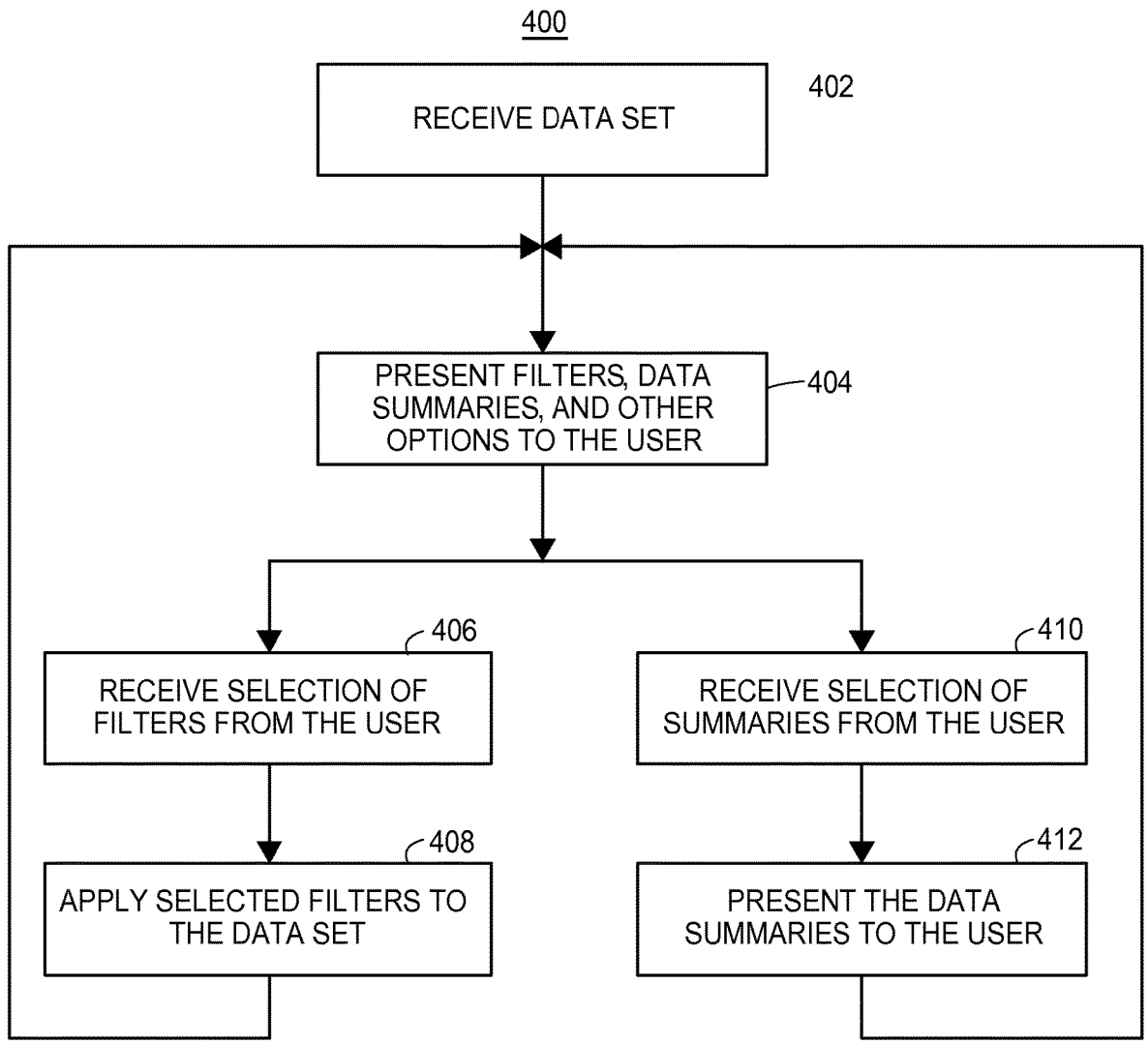
FIG. 4 illustrates an alternative exemplary dynamic global filtering process.

FIG. 4 illustrates an alternative exemplary dynamic global filtering process 400. The alternative process 400 applies the selected filters to the data set, rather than the reports or dashboards. The process 400 begins at block 402 when the server 140 receives one or more data sets. The server 140 then causes options to be presented to the user via the workstation 128 at block 404. The options include at least options to select a set of one or more filters and options to select a set of one or more data summaries. Where the user selects one or more filters using the workstation 128, the server 140 receives a request to apply the filters to the data set at block 406. The server 140 may then use the filter module 144 to apply the set of filters to the data set to produce a filtered data set at block 408. The filtered data set may be a temporary data set stored in the database 146 or the RAM 164. The filtered data set may then serve as the basis of data summaries selected by the user. In some embodiments, the set of filters received in block 406 may be applied to the data set received in block 402 in each case. In other embodiments, the set of filters received in block 406 may be applied to a previously produced filtered data set if the most recently received filter conditions include all the filter conditions previously received. Where the user selects one or more data summaries using the workstation 128, the server 140 receives a request to present one or more data summaries to the user at block 410. The server 140 may then implement report module 142 or dashboard module 143 to generate and present the requested data summaries at block 412. The data summaries may be generated using the filtered data set if the user has selected a set of filters or the data set received at block 402 if no filters have been selected. In some embodiments, the server 140 may generate the data summaries without implementing the modules 142 and 143 and may cause the data summaries to be presented to the user by the workstation 128. In other embodiments, the server 140 may communicate the relevant data from the data set or the filtered data set to the workstation 128, which may generate and present the data summaries to the user.

Figure 5:
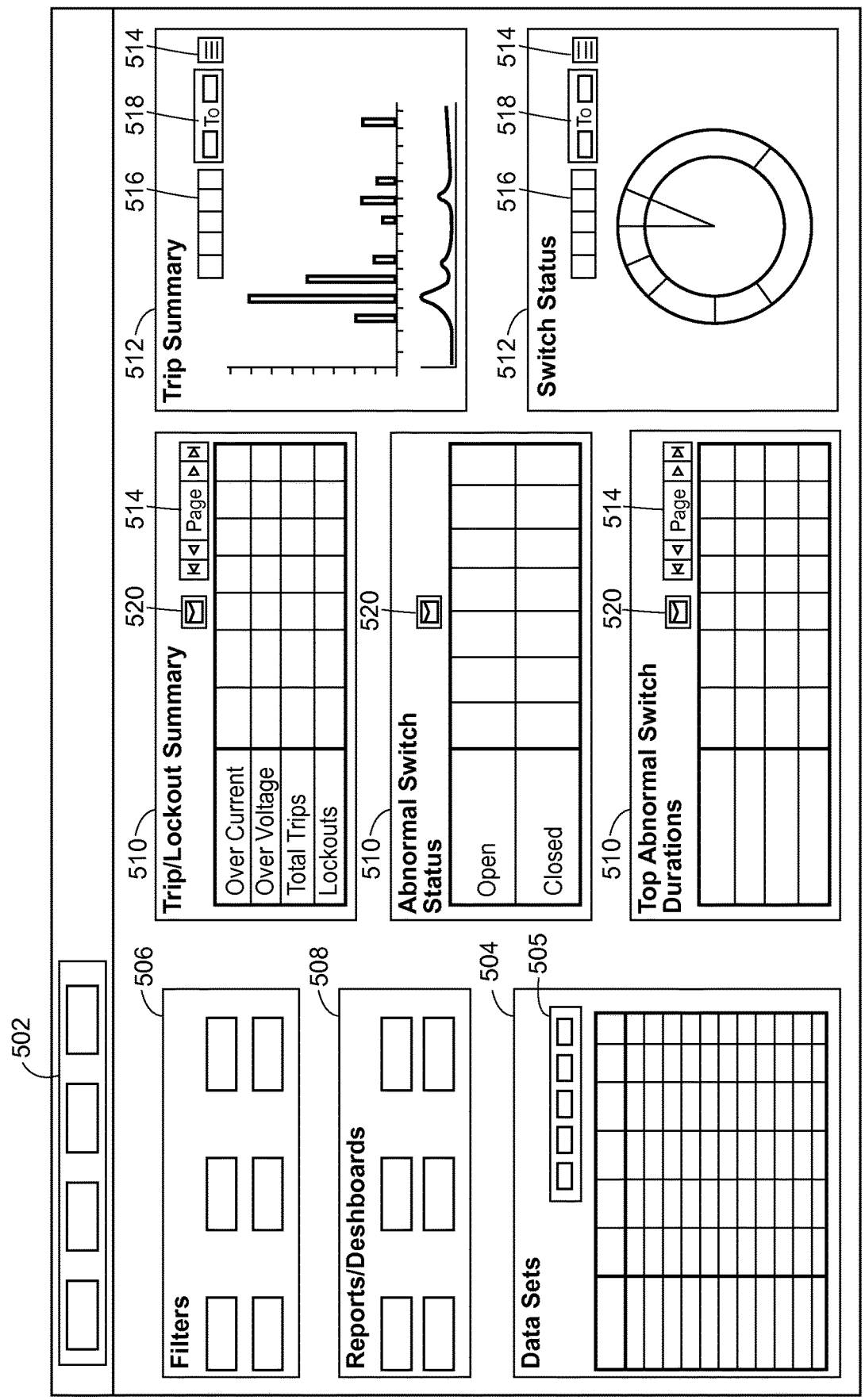
FIG. 5 illustrates an exemplary embodiment of a user interface screen associated with the dynamic global filtering system in accordance with the described embodiments.

FIG. 5 depicts an exemplary user interface 500 of a software application that may be displayed to the user on the display 186 of the workstation 128 as part of the dynamic global filtering system 100 for operation of an electric power grid. The user interface 500 presents a variety of controls, options, data, and data summaries to the user on one or more screens to facilitate analysis by the user. It should be understood that the depicted user interface 500 is exemplary only, and additional or alternative configurations may be implemented. Also, the user interface 500 or another user interface may be displayed to the user on any device capable of displaying text and graphics, including the screen of a desktop computer, tablet computer, smartphone or other mobile device, wearable computing device, or any other display device.

The user interface 500 may include a set of primary controls 502 allowing the user to interact with the software application, including accessing files or data sets, saving or retrieving saved data filters, viewing alerts, customizing configuration of the user interface 500, or terminating the software application. The user interface 500 may further include a data set table 504 to display a portion of the active data set to the user to allow verification of the contents thereof. Where more than one data set is being analyzed, the data set table may include tabs, buttons, menus, or other navigation features 505 to select a data set to display. In addition, the user interface may contain a set of filter options 506 that allow the user to select one or more data filters to apply to the data in producing the data summaries. When the user selects one or more of the data filters in the set of filter options 506, the filters may be applied as discussed above. Similarly, a set of data summaries 508 may be included to present the user with a number of available reports and dashboards. When the user selects one or more data summaries from the set of data summaries 508, the selected reports or dashboards may be presented to the user as discussed above. The set of filter options 506 or the set of data summary options 508 may be presented to the user as one or more drop-down menus, sliders, text boxes, check boxes, or other known means of presenting options for a user to select.

The user interface 500 may further include a number of tabular data summaries 510 and a number of graphical data summaries 512. The tabular and graphical data summaries 510 and 512 may each be arranged in a window containing a fraction of the screen size of the user interface 500, and each may further be positioned or repositioned within the user interface 500 by the user. Each of the data summaries 510 or 512 may include navigation buttons 514, detail level selectors 516, or data range selectors 518 to further facilitate user analysis of the data. In some embodiments, each data summary 510 or 512 may further include data export controls 520 to permit the user to save, transmit, print, or otherwise export the contents of the data summary 510 or 512 for further use outside of the software application.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A computer-implemented method for improving data presentation for electric power system operation by applying data filters across a plurality of summaries of data in an application, comprising: receiving, at one or more processors, a data set stored in one or more databases, wherein the data set includes data related to at least one of the following components in an electric power generation, transmission, and distribution system: a switch, a circuit breaker, a recloser, a transformer, a fuse, a fuse cutout, a disconnect, a capacitor, a compensator, a control device, a station, a substation, a line, or a smart meter; presenting, by one or more processors, a plurality of data filters to a user of the application; receiving, at one or more processors, a request from the user to apply a set of one or more of the data filters to the data set; generating, by one or more processors, a first summary of the data set by applying the set of data filters to the data set; presenting, by one or more processors, the first summary of the data set to the user; receiving, at one or more processors, a request from the user to present a second summary of the data set; generating, by one or more processors, the second summary of the data set by applying the set of data filters to the data set; and presenting, by one or more processors, the second summary of the data set to the user.

2. The computer-implemented method according to aspect 1, wherein: generating the first summary of the data set by applying the set of data filters to the data set further comprises adjusting the first summary of the data set to apply, by the one or more processors, the set of data filters to the data set; and generating the second summary of the data set by applying the set of data filters to the data set further comprises adjusting the second summary of the data set to apply, using the one or more processors, the set of data filters to the data set.

3. The computer-implemented method of claim 1, further comprising storing, in a memory connected to one or more processors, the set of one or more of the data filters for future use by the user.

4. The computer-implemented method according to either of aspect 1 or aspect 2, wherein each of the first summary and the second summary comprise one or more of the following: a graphical report, a tabular report, a textual report, a graphical dashboard, a tabula dashboard, or a textual dashboard.

5. The computer-implemented method according to any of aspects 1-3, wherein each of the first summary and the second summary summarize information regarding one or more of the following: status of the components, type of the components, location of the components, reliability of the components, or events relating to the components.

6. The computer-implemented method according to any of aspects 1-4, wherein the plurality of data filters includes one or more of the following: date, time, geographic area, type of process, type of equipment, operating status, completion status, value, operational division, project, customer, type of data field, type of data value, type of event, number of events, type of alert, number of alerts, node, type of node, or level of node.

7. The computer-implemented method according to any of aspects 1-5, wherein: at least one of the one or more processors is implemented within a server communicatively connected to a network; presenting the first summary further includes transmitting information regarding the first summary from the server to the user through the network; and presenting the second summary further includes transmitting information regarding the first summary from the server to the user through the network.

8. A computer system for improving data presentation for electric power system operation by applying data filters across a plurality of summaries of data in an application, comprising: one or more processors; one or more databases; a program memory storing executable instructions that when executed by the one or more processors cause the computer system to: receive a data set stored in the one or more databases, wherein the data set includes data related to at least one of the following components in an electric power generation, transmission, and distribution system: a switch, a circuit breaker, a recloser, a transformer, a fuse, a fuse cutout, a disconnect, a capacitor, a compensator, a control device, a station, a substation, a line, or a smart meter; present a plurality of data filters to a user of the application; receive a request from the user to apply a set of one or more of the data filters to the data set; generate a first summary of the data set by applying the set of data filters to the data set; present the first summary of the data set to the user; receive a request from the user to present a second summary of the data set; generate the second summary of the data set by applying the set of data filters to the data set; and present the second summary of the data set to the user.

9. The computer system according to aspect 8, wherein: the executable instructions that cause the computer system to generate the first summary of the data set by applying the set of data filters to the data set further comprise instructions that cause the computer system to adjust the first summary of the data set to apply the set of data filters to the data set; and the executable instructions that cause the computer system to generate the second summary of the data set by applying the set of data filters to the data set further comprise instructions that cause the computer system to adjust the second summary of the data set to apply the set of data filters to the data set.

10. The computer system according to either of aspect 8 or aspect 9, further comprising executable instructions that cause the computer system to store in the program memory the set of one or more of the data filters for future use by the user.

11. The computer system according to any of aspects 8-10, wherein each of the first summary and the second summary comprise one or more of the following: a graphical report, a tabular report, a textual report, a graphical dashboard, a tabula dashboard, or a textual dashboard.

12. The computer system according to any of aspects 8-11, wherein each of the first summary and the second summary summarize information regarding one or more of the following: status of the components, type of the components, location of the components, reliability of the components, or events relating to the components.

13. The computer system according to any of aspects 8-12, wherein the plurality of data filters includes one or more of the following: date, time, geographic area, type of process, type of equipment, operating status, completion status, value, operational division, project, customer, type of data field, type of data value, type of event, number of events, type of alert, number of alerts, node, type of node, or level of node.

14. The computer system according to any of aspects 8-13, wherein at least one of the one or more processors is implemented within a server communicatively connected to a network, and wherein: the executable instructions that cause the computer system to present the first summary to the user further comprise instructions that cause the computer system to transmit information regarding the first summary from the server to the user through the network; and the executable instructions that cause the computer system to present the second summary to the user further comprise instructions that cause the computer system to transmit information regarding the second summary from the server to the user through the network.

15. A tangible, non-transitory computer-readable medium storing instructions for improving data presentation for electric power system operation by applying data filters across a plurality of summaries of data in an application, which instructions when executed by one or more processors of a computer system cause the computer system to: receive a data set stored in one or more databases, wherein the data set includes data related to at least one of the following components in an electric power generation, transmission, and distribution system: a switch, a circuit breaker, a recloser, a transformer, a fuse, a fuse cutout, a disconnect, a capacitor, a compensator, a control device, a station, a substation, a line, or a smart meter; present a plurality of data filters to a user of the application; receive a request from the user to apply a set of one or more of the data filters to the data set; generate a first summary of the data set by applying the set of data filters to the data set; present the first summary of the data set to the user; receive a request from the user to present a second summary of the data set; generate the second summary of the data set by applying the set of data filters to the data set; and present the second summary of the data set to the user.

16. The tangible, non-transitory computer-readable medium according to aspect 15, wherein: the executable instructions that cause the computer system to generate the first summary of the data set by applying the set of data filters to the data set further comprise instructions that cause the computer system to adjust the first summary of the data set to apply the set of data filters to the data set; and the executable instructions that cause the computer system to generate the second summary of the data set by applying the set of data filters to the data set further comprise instructions that cause the computer system to adjust the second summary of the data set to apply the set of data filters to the data set.

17. The tangible, non-transitory computer-readable medium according to either of aspect 15 or aspect 16, wherein the executable instructions further cause the computer system to store in the program memory the set of one or more of the data filters for future use by the user.

18. The tangible, non-transitory computer-readable medium according to any of aspects 15-17, wherein each of the first summary and the second summary comprise one or more of the following: a graphical report, a tabular report, a textual report, a graphical dashboard, a tabula dashboard, or a textual dashboard.

19. The tangible, non-transitory computer-readable medium according to any of aspects 15-18, wherein each of the first summary and the second summary summarize information regarding one or more of the following: status of the components, type of the components, location of the components, reliability of the components, or events relating to the components.

20. The tangible, non-transitory computer-readable medium according to any of aspects 15-19, wherein the plurality of data filters includes one or more of the following: date, time, geographic area, type of process, type of equipment, operating status, completion status, value, operational division, project, customer, type of data field, type of data value, type of event, number of events, type of alert, number of alerts, node, type of node, or level of node.

21. The tangible, non-transitory computer-readable medium according to any of aspects 15-20, wherein at least one of the one or more processors is implemented within a server communicatively connected to a network, and wherein: the executable instructions that cause the computer system to present the first summary to the user further comprise instructions that cause the computer system to transmit information regarding the first summary from the server to the user through the network; and the executable instructions that cause the computer system to present the second summary to the user further comprise instructions that cause the computer system to transmit information regarding the second summary from the server to the user through the network.

What is claimed is:

1. A computer-implemented method, comprising:
    accessing, by one or more processors, a first data set stored in one or more databases, wherein the first data set includes data related to at least one of the following components in an electric power generation, transmission, and distribution system: a switch, a circuit breaker, a recloser, a transformer, a fuse, a fuse cutout, a disconnect, a capacitor, a compensator, a control device, a station, a substation, a line, or a smart meter;
    receiving, via a user interface, a first request to present a first summary of the first data set according to a first type of summary, and user input indicating a user selection of a first plurality of criteria for filtering data from a first set of selectable filtering criteria, wherein the first set of selectable filtering criteria is based on the first data set;
    applying, by one or more processors, first query conditions that are based on the first plurality of criteria for filtering data, and second query conditions associated with the first type of summary to the first data set to obtain a second data set, wherein the first set of selectable filtering criteria is selected to prevent the second set of data from being empty;
    formatting, by one or more processors, the second data set according to the first type of summary to form the first summary;
    presenting, at the user interface by a display, the first summary;
    receiving, via the user interface, a second request to present a second summary of the first data set;
    when the second request does not include criteria for filtering data:
        applying, by one or more processors, the first query conditions and third query conditions associated with the second type of summary to the first data set to obtain a third data set that is different from the second data set;
        formatting, by one or more processors, the third data set according to the second type of summary to form the second summary;
    when the second request includes a second plurality of criteria for filtering data selected from a second set of selectable filtering criteria, wherein the second set of selectable filtering criteria is based on the first data set:
        applying, by one or more processors, fourth query conditions that are based on the second plurality of criteria for filtering data, and the third query conditions associated with the second type of summary to the first data set to obtain a fourth data set, wherein the second set of selectable filtering criteria is selected to prevent the third set of data from being empty, and
        formatting, by one or more processors, the fourth data set according to the second type of summary to form the second summary; and
    presenting, at the user interface by the display, the second summary.

2. The computer-implemented method of claim 1, further comprising storing, in a memory connected to one or more processors, the first query conditions associated with the first plurality of criteria for future use by the user.

3. The computer-implemented method of claim 2, wherein the one or more global data filters includes one or more of the following: date, time, geographic area, type of process, type of equipment, operating status, completion status, value, operational division, project, customer, type of data field, type of data value, type of event, number of events, type of alert, number of alerts, node, type of node, or level of node.

4. The computer-implemented method of claim 1, wherein each of the first summary and the second summary comprise one or more of the following: a graphical report, a tabular report, a textual report, a graphical dashboard, a tabula dashboard, or a textual dashboard.

5. The computer-implemented method of claim 1, wherein each of the first summary and the second summary summarize information regarding one or more of the following: status of the components, type of the components, location of the components, reliability of the components, or events relating to the components.

6. The computer-implemented method of claim 1, wherein:
at least one of the one or more processors is implemented within a server communicatively connected to a network;
presenting the first summary further includes transmitting information regarding the first summary from the server to the user interface through the network; and
presenting the second summary further includes transmitting information regarding the first summary from the server to the user interface through the network.

7. A computer system, comprising:
one or more processors;
one or more databases;
a memory storing executable instructions that, when executed by the one or more processors, cause the computer system to:
access a first data set stored in the one or more databases, wherein the first data set includes data related to at least one of the following components in an electric power generation, transmission, and distribution system: a switch, a circuit breaker, a recloser, a transformer, a fuse, a fuse cutout, a disconnect, a capacitor, a compensator, a control device, a station, a substation, a line, or a smart meter;
obtain, via a user interface, a first request to present a first summary of the first data set according to a first type of summary, and user input indicating a user selection of a first plurality of criteria for filtering data from a first set of selectable filtering criteria, wherein the first set of selectable filtering criteria is based on the first data set;
apply first query conditions that are based on the first plurality of criteria, and second query conditions associated with the first type of summary to the first data set to obtain a second data set, wherein the first set of selectable filtering criteria is selected to prevent the second set of data from being empty;
format the second data set according to the first type of summary to form the first summary;
present, at the user interface, the first summary;
receive, via the user interface, a second request to present a second summary of the first data set according to a second type of summary, the second type of summary different from the first type of summary;
when (i) the second request does not specify any criteria for filtering data and (ii) the first plurality of criteria for filtering data set of query conditions has previously been received:
apply the first query conditions and third query conditions associated with the second type of summary to the first data set to obtain a third data set, and
format the third data set according to the second type of summary; and
present, at the user interface, the second summary.

8. The computer system of claim 7, further comprising executable instructions that cause the computer system to store in the memory one or more of global data filters associated with the first plurality of criteria for filtering data for future use by the user.

9. The computer system of claim 8, wherein the one or more global data filters includes one or more of the following: date, time, geographic area, type of process, type of equipment, operating status, completion status, value, operational division, project, customer, type of data field, type of data value, type of event, number of events, type of alert, number of alerts, node, type of node, or level of node.

10. The computer system of claim 7, wherein each of the first summary and the second summary comprise one or more of the following: a graphical report, a tabular report, a textual report, a graphical dashboard, a tabula dashboard, or a textual dashboard.

11. The computer system of claim 7, wherein each of the first summary and the second summary summarize information regarding one or more of the following: status of the components, type of the components, location of the components, reliability of the components, or events relating to the components.

12. The computer system of claim 7, wherein at least one of the one or more processors is implemented within a server communicatively connected to a network, and wherein the executable instructions cause the computer system to:
obtain the first request and the user input by receiving information from the user interface implemented by a workstation through the network; and
present the first summary by transmitting information regarding the first summary from the server to a workstation through the network for presentation at the user interface implemented by the workstation.

13. A tangible, non-transitory computer-readable medium storing instructions for improving data presentation for electric power system operation by applying dynamic global data filters across a plurality of summaries of data in an application, which instructions when executed by one or more processors of a computer system cause the computer system to:
access a first data set stored in the one or more databases, wherein the first data set includes data related to at least one of the following components in an electric power generation, transmission, and distribution system: a switch, a circuit breaker, a recloser, a transformer, a fuse, a fuse cutout, a disconnect, a capacitor, a compensator, a control device, a station, a substation, a line, or a smart meter;
obtain, via a user interface, a first request to present a first summary of the first data set according to a first type of summary, and user input indicating a user selection of a first plurality of criteria for filtering data from a first set of selectable filtering criteria, wherein the first set of selectable filtering criteria is based on the first data set;
apply first query conditions that are based on the first plurality of criteria, and second query conditions associated with the first type of summary to the first data set to obtain a second data set, wherein the first set of selectable filtering criteria is selected to prevent the second set of data from being empty;
format the second data set according to the first type of summary to form the first summary;
present, at the user interface, the first summary;
receive, via the user interface, a second request to present a second summary of the first data set when (i) the second request does not specify any criteria for filtering data and (ii) the first plurality of criteria for filtering data set of query conditions has previously been received:
 apply the first query conditions and third query conditions associated with the second type of summary to the first data set to obtain a third data set, and
 format the third data set according to the second type of summary; and
present, at the user interface, the second summary.

14. The tangible, non-transitory computer-readable medium of claim 13, wherein the executable instructions further cause the computer system to store in the program memory one or more global data filters associated the first plurality of criteria for filtering data for future use by the user.

15. The tangible, non-transitory computer-readable medium of claim 14, wherein the one or more global data filters includes one or more of the following: date, time, geographic area, type of process, type of equipment, operating status, completion status, value, operational division, project, customer, type of data field, type of data value, type of event, number of events, type of alert, number of alerts, node, type of node, or level of node.

16. The tangible, non-transitory computer-readable medium of claim 13, wherein each of the first summary and the second summary comprise one or more of the following: a graphical report, a tabular report, a textual report, a graphical dashboard, a tabula dashboard, or a textual dashboard.

17. The tangible, non-transitory computer-readable medium of claim 13, wherein each of the first summary and the second summary summarize information regarding one or more of the following: status of the components, type of the components, location of the components, reliability of the components, or events relating to the components.

* * * * *